United States Patent
Galestien (10) Patent No.: US 11,118,889 B2
(45) Date of Patent: Sep. 14, 2021

(54) METHOD AND SYSTEM FOR MEASURING AT LEAST ONE GEOMETRICAL CHARACTERISTIC OF A GAUGE

(71) Applicant: Reginald Galestien, Emmen (NL)

(72) Inventor: Reginald Galestien, Emmen (NL)

( * ) Notice: Subject to any disclaimer, the term of this patent is extended or adjusted under 35 U.S.C. 154(b) by 188 days.

(21) Appl. No.: 16/461,858

(22) PCT Filed: Oct. 17, 2017

(86) PCT No.: PCT/NL2017/050679
§ 371 (c)(1),
(2) Date: May 17, 2019

(87) PCT Pub. No.: WO2018/093247
PCT Pub. Date: May 24, 2018

(65) Prior Publication Data
US 2019/0368853 A1    Dec. 5, 2019

(30) Foreign Application Priority Data
Nov. 21, 2016    (NL) ...................................... 1042154

(51) Int. Cl.
*G01B 5/008* (2006.01)
*G01B 3/30* (2006.01)
*G01B 5/20* (2006.01)
*G01B 21/04* (2006.01)

(52) U.S. Cl.
CPC .............. *G01B 5/008* (2013.01); *G01B 3/30* (2013.01); *G01B 5/20* (2013.01); *G01B 21/042* (2013.01)

(58) Field of Classification Search
CPC ...................................... G01B 5/20
USPC ......................................................... 33/501.5
See application file for complete search history.

(56) References Cited

U.S. PATENT DOCUMENTS

| | | | | |
|---|---|---|---|---|
| 2009/0300930 A1* | 12/2009 | Ishikawa | .................. | G01B 5/28 33/559 |
| 2010/0050837 A1* | 3/2010 | Ould | .................... | G01B 21/042 83/14 |
| 2011/0085132 A1* | 4/2011 | Dubois | ................ | G02C 13/005 351/159.75 |

(Continued)

FOREIGN PATENT DOCUMENTS

| | | |
|---|---|---|
| CN | 105157653 | 12/2015 |
| CN | 106705868 A | 5/2017 |
| JP | S59131101 | 7/1984 |

*Primary Examiner* — George B Bennett
(74) *Attorney, Agent, or Firm* — Pearne & Gordon LLP (57) ABSTRACT

In a method for measuring a gauge (20), the invention provides a standard (30). The standard has a calibrated standard distance (33) between a standard reference plane (31) and a standard detection line (35), being mutually parallel. When the standard is placed with its standard reference plane onto a gauge reference plane (21), the standard is traced with a tracing point (12) of a measuring apparatus (10). Thereby it is possible to reliably measure the distance (43) between the standard detection line (35) and the apparatus reference plane (11), and hence the distance between the gauge reference plane (21) and the apparatus reference plane (11). The invention allows to reliably measure gauges in an affordable, non-complex measuring apparatus, in cases where, in order to reliably measure gauges in the apparatus, such gauges cannot be placed with their gauge reference planes onto the apparatus reference plane.

5 Claims, 9 Drawing Sheets

(56) References Cited

U.S. PATENT DOCUMENTS

2014/0283402 A1\* 9/2014 Hidaka .................... G01B 5/28
33/556
2020/0200519 A1\* 6/2020 Leber ....................... G01B 5/20
2020/0355485 A1\* 11/2020 Schwarzer ............... G01B 5/20

\* cited by examiner

METHOD AND SYSTEM FOR MEASURING AT LEAST ONE GEOMETRICAL CHARACTERISTIC OF A GAUGE

The invention relates to a method for measuring at least one geometrical characteristic of a gauge in a gauge holding condition, in which the gauge is held in an apparatus for measuring at least part of a gauge contour of the gauge by tracing the gauge contour with a tracing point of a tracing structure of the apparatus against and along said gauge contour, said tracing the gauge contour taking place in a tracing direction, which has at least a component in an axial direction being parallel to a gauge centre line of the gauge, wherein:

the gauge has a gauge reference plane, being a two-dimensionally straight external surface portion of the gauge, and being perpendicular to said axial direction, said at least one geometrical characteristic of the gauge is occurring in a gauge plane, which is perpendicular to the gauge centre line, said gauge plane having a pre-defined axial distance relative to said gauge reference plane, as seen along the gauge centre line;

and wherein, as seen in said gauge holding condition:

the apparatus has an apparatus reference plane, being a two-dimensionally straight external surface portion of the apparatus, and being perpendicular to said axial direction;

the apparatus is configured for determining, as a function of time during said tracing the gauge contour, the relative axial position along said axial direction of said tracing point relative to said apparatus reference plane, as well as the radial position of said tracing point relative to said gauge centre line.

The invention further relates to a system configured for carrying out such a method.

In practice many various gauges of the abovementioned type exist, wherein various gauge manufacturers have defined the abovementioned gauge reference planes and the abovementioned gauge planes to be located at many various different axial positions along the abovementioned axial direction, as compared between all the different gauges.

For some gauges, the gauge reference plane is defined in a favourable manner. In these favourable cases, the gauge can be mounted in the apparatus in such manner that the gauge reference plane and the apparatus reference plane in the abovementioned gauge holding condition are contactingly lying against one another in a mutually parallel manner, while the tracing point of the tracing structure of the apparatus during tracing the gauge contour can reach all required locations in a satisfactory manner, including the locations in the gauge plane where the geometrical characteristic concerned has to be measured. In these cases the apparatus during tracing knows the axial position of the tracing point relative to the apparatus reference plane, and hence relative to the gauge reference plane (which is at the same axial position as the apparatus reference plane). Accordingly, the apparatus knows exactly when the tracing point is at the axial position of the gauge plane during tracing (note that the gauge plane has the abovementioned pre-defined axial distance relative to the gauge reference plane). It is important that the apparatus knows exactly when the tracing point is at the axial position of the gauge plane, since at this exact gauge plane the abovementioned geometrical characteristic (e.g. local diameter of the gauge) has to be accurately measured.

For many other gauges, however, the gauge reference plane is defined by the various gauge manufacturers in an unfavourable manner for certain measuring apparatus.

In some of these unfavourable cases, it is simply impossible to mount the gauge in the apparatus in such manner that the gauge reference plane and the apparatus reference plane in the abovementioned gauge holding condition are contactingly lying against one another in a mutually parallel manner.

In other of these unfavourable cases, the gauge could in principle be mounted in the apparatus in such manner that the gauge reference plane and the apparatus reference plane in the abovementioned gauge holding condition are contactingly lying against one another in a mutually parallel manner. However, if so mounted, in these other unfavourable cases, the tracing point of the tracing structure of several known apparatus during tracing the gauge contour can not reach all required locations, for example it can simply not reach the locations in the gauge plane where the geometrical characteristic concerned has to be measured.

Accordingly, in all these unfavourable cases the gauge must be mounted in the apparatus in a certain other mounting manner, in which the gauge reference plane and the apparatus reference plane are not at the same axial position along the gauge centre line. Hence, in all these unfavourable cases, although the apparatus during tracing does know the axial position of the tracing point relative to the apparatus reference plane, the apparatus does not know the axial position of the tracing point relative to the gauge reference plane. Hence, since the gauge plane has its pre-defined axial distance relative to this gauge reference plane, the apparatus does not know when the tracing point is at the axial position of the gauge plane during tracing.

In most of the abovediscussed unfavourable cases where the gauge is mounted in the apparatus in said certain other mounting manner, it is impossible for many of the affordable, non-complex measuring apparatus (such as the known 2D tracing apparatus types) to reliably measure the axial location of the gauge reference plane relative to the apparatus reference plane. The reason is that in practice the gauge reference plane, as seen in axial direction, is located at an abrupt end face of the gauge, or a circumferential groove of the gauge, or the like. This means that the circumferential edge of the gauge reference plane is at a location of the gauge where rounding, chamfering, or the like, are present. This makes it impossible for the usual tracing structure of known affordable, non-complex measuring apparatus (such as the known 2D tracing apparatus types) to reliably determine the axial location of the gauge reference plane by tracing at the difficult circumferential edge of the gauge reference plane.

In view of all the above it will be clear that, generally, an expensive and sophisticated apparatus is required in order to be able to reliably measure a wide range of many various gauges that exist in practice.

It is an object of the invention to provide a solution, according to which a wide range of many various gauges existing in practice can be reliably measured by an affordable, non-complex measuring apparatus, such as the known 2D tracing apparatus types.

For that purpose the invention provides a method according to the appended independent claim 1, as well as a system according to the appended independent claim 5. Preferable embodiments of the invention are provided by the appended dependent claims 2-4.

Hence, the invention provides a method for measuring at least one geometrical characteristic of a gauge in a gauge holding condition, in which the gauge is held in an apparatus for measuring at least part of a gauge contour of the gauge by tracing the gauge contour with a tracing point of a tracing structure of the apparatus against and along said gauge contour, said tracing the gauge contour taking place in a tracing direction, which has at least a component in an axial direction being parallel to a gauge centre line of the gauge, wherein:

the gauge has a gauge reference plane, being a two-dimensionally straight external surface portion of the gauge, and being perpendicular to said axial direction, said at least one geometrical characteristic of the gauge is occurring in a gauge plane, which is perpendicular to the gauge centre line, said gauge plane having a pre-defined axial distance relative to said gauge reference plane, as seen along the gauge centre line;

and wherein, as seen in said gauge holding condition:

the apparatus has an apparatus reference plane, being a two-dimensionally straight external surface portion of the apparatus, and being perpendicular to said axial direction;

the apparatus is configured for determining, as a function of time during said tracing the gauge contour, the relative axial position along said axial direction of said tracing point relative to said apparatus reference plane, as well as the radial position of said tracing point relative to said gauge centre line;

characterized in that the method comprises the steps of:

providing at least one standard, which comprises:

standard-to-gauge assembling means for releasably assembling the standard to the gauge in a mutually assembled standard-to-gauge condition of the standard and the gauge;

a standard reference plane, being a two-dimensionally straight external surface portion of the standard, wherein the standard reference plane and the gauge reference plane in said standard-to-gauge condition are contactingly lying against one another in a mutually parallel manner;

a standard tracing plane, being a convex or concave external surface portion of the standard, and forming a tracing surface for the tracing point of the tracing structure of the apparatus as seen in a combined assembling condition of both said gauge holding condition and said standard-to-gauge condition, wherein the standard tracing plane has a standard detection line, being a line segment formed by crown-of-arch positions on the standard tracing plane, i.e. in crown-of-arch sense, in other words apex sense, of said convexness or concaveness as will be experienced during tracing the standard tracing plane with the tracing point in said combined assembling condition, and wherein the standard detection line is parallel to the standard reference plane; and a calibrated standard distance between said standard detection line and said standard reference plane, as seen in a direction perpendicularly to said standard reference plane;

bringing the apparatus, the gauge and the standard in said combined assembling condition;

in said combined assembling condition: tracing the standard tracing plane of the standard with the tracing point of the tracing structure of the apparatus, thereby determining, as a function of time during said tracing the standard tracing plane, the relative axial position along said axial direction of said tracing point relative to said apparatus reference plane, as well as the radial position of said tracing point relative to said gauge centre line, thereby determining the axial distance, as seen along said axial direction, between said standard detection line and said apparatus reference plane.

Hence, thanks to the use of said standard, which has the reliably measurable standard detection line of the standard tracing plane, and which has the calibrated standard distance between the standard detection line and the standard reference plane, the invention allows to reliably determine the axial distance between the gauge reference plane and the apparatus reference plane in the said combined assembling condition of apparatus, gauge, and standard. Thanks to the invention, this reliable determination of axial distance between reference planes of gauge and apparatus is now possible in all of the abovediscussed unfavourable cases when various gauges are mounted in various apparatus, and despite the abovementioned difficultly traceable circumferential edges of the gauge reference planes of the gauges. This means that, since the gauge plane has its pre-defined axial distance relative to the gauge reference plane, the apparatus now reliably knows when the tracing point is at the axial position of the gauge plane during tracing. Accordingly, the invention provides an effective solution, according to which a wide range of many various gauges existing in practice can be reliably measured by an affordable, non-complex measuring apparatus, such as the known 2D tracing apparatus types.

In principle, the present invention may be applied in combination with many various measuring apparatus, including, for example, highly sophisticated 3D measuring apparatus.

In a preferable embodiment of a method according to the invention, the apparatus is a two-dimensional tracing apparatus in that the apparatus is configured such that, during said tracing the gauge contour with the tracing point, the tracing point remains in a two-dimensional plane, which contains said gauge centre line, wherein the movement of the tracing point is being actuated by the apparatus in said axial direction being parallel to the gauge centre line, while at the same time the tracing point is following the gauge contour in radial direction relative to the gauge centre line.

This specific combination of the present invention with 2D tracing apparatus extends the applicabilities of 2D tracing apparatus to a great extent, which is a substantial benefit for the industry.

In principle, the standard-to-gauge assembling means of the standard may comprise many various assembling means for said releasably assembling the standard to the gauge, including, for example, various clamping means.

In a further preferable embodiment of a method according to the invention, the standard-to-gauge assembling means of the standard comprises a magnet for said releasably assembling the standard to the gauge.

In principle, many various embodiments of the standard tracing plane, being a one-dimensionally convex or one-dimensionally concave external surface portion of the standard, may be applied.

In a yet further preferable embodiment of a method according to the invention, the standard comprises a cylindrical pin having a pin centre line being parallel to the standard reference plane, wherein the cylindrical pin is fixedly attached to or integrally manufactured with the standard in such manner that:

an external surface portion of the cylindrical pin is forming said convex external surface portion of the standard; and said calibrated standard distance between said standard reference plane and said standard detection line is equal to the distance between said standard reference plane and the pin centre line, as seen in a direction perpendicularly to said standard reference plane.

Furthermore, the invention is embodied in a system configured for carrying out a method according to the invention and its abovedescribed preferable embodiments, wherein the system comprises:
- an apparatus as defined in the method according to the invention and its abovedescribed preferable embodiments; and
- at least one standard as defined in the method according to the invention and its abovedescribed preferable embodiments.

The abovementioned aspects and other aspects of the invention will be apparent from and elucidated with reference to the embodiments described hereinafter by way of non-limiting examples only and with reference to the schematic figures in the enclosed drawing.

Now, reference is first made to FIGS. 1-4. The reference signs used in FIGS. 1-4 are referring to the abovementioned parts and aspects of the invention, as well as to related parts and aspects, in the following manner.

1 geometrical characteristic of gauge
7 axial direction
10 apparatus
11 apparatus reference plane
12 tracing point
14, 14A tracing direction
15 tracing probe
16 tracing arm
20 gauge
21 gauge reference plane
22 gauge plane
23 pre-defined axial distance between gauge plane and gauge reference plane
24, 24A gauge contour
25 gauge end surface
26 gauge mandrel
27 gauge centre line
30, 30A standard
31 standard reference plane
32 standard-to-gauge assembling means
33 calibrated standard distance
34 standard tracing plane
35 standard detection line
36 cylindrical pin
37 pin centre line
43 axial distance between pin centre line 37 and apparatus reference plane 11

Based on the above introductory description, including the above brief description of the drawing figures, and based on the above-explained reference numerals used in FIGS. 1-4, the shown examples of FIGS. 1-4 are for the greatest part readily self-explanatory. The following extra explanations are given.

Figure 1:
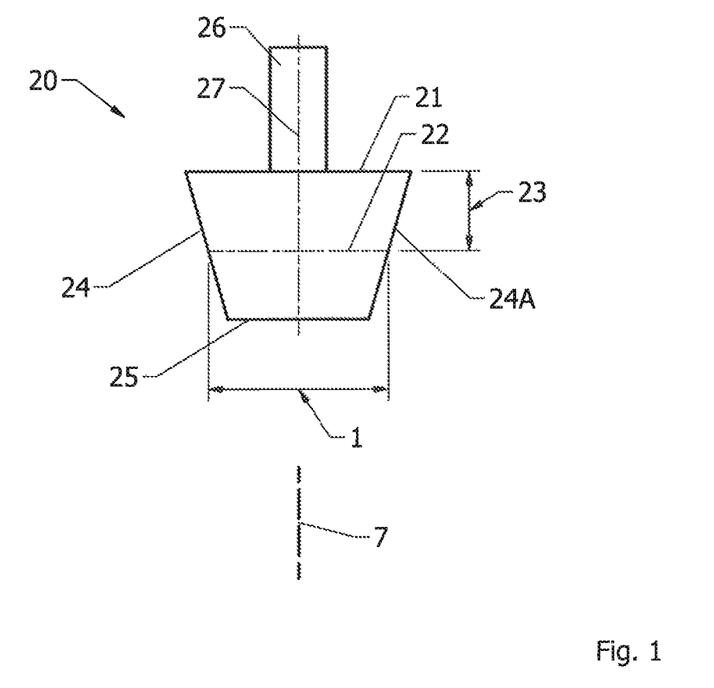
FIG. 1 shows an example of a gauge for use in connection with the invention, wherein the gauge is a conical plug gauge, and wherein the figure shows a view onto a cross-sectional plane through the gauge, said cross-sectional plane containing the gauge centre line of the gauge, and wherein the conical plug gauge has one protrusion in the form of a mandrel at the shown upper axial end of the gauge.

FIG. 1 shows the conical plug gauge 20, which has a protrusion in the form of a mandrel 26 at the shown upper axial end of the gauge. The other axial end of the gauge is formed by gauge end surface 25, which is a two-dimensionally straight plane. In the shown example the gauge reference plane 21 is located at an axial position, which corresponds to the transition from the conical part of the gauge 20 to the mandrel 26. The geometrical characteristic 1 of gauge 20 that has to be measured is the outside diameter 1 of the gauge 20 at the gauge plane 22, which is at the pre-defined axial distance 23 relative to the gauge reference plane 21.

Figure 2:
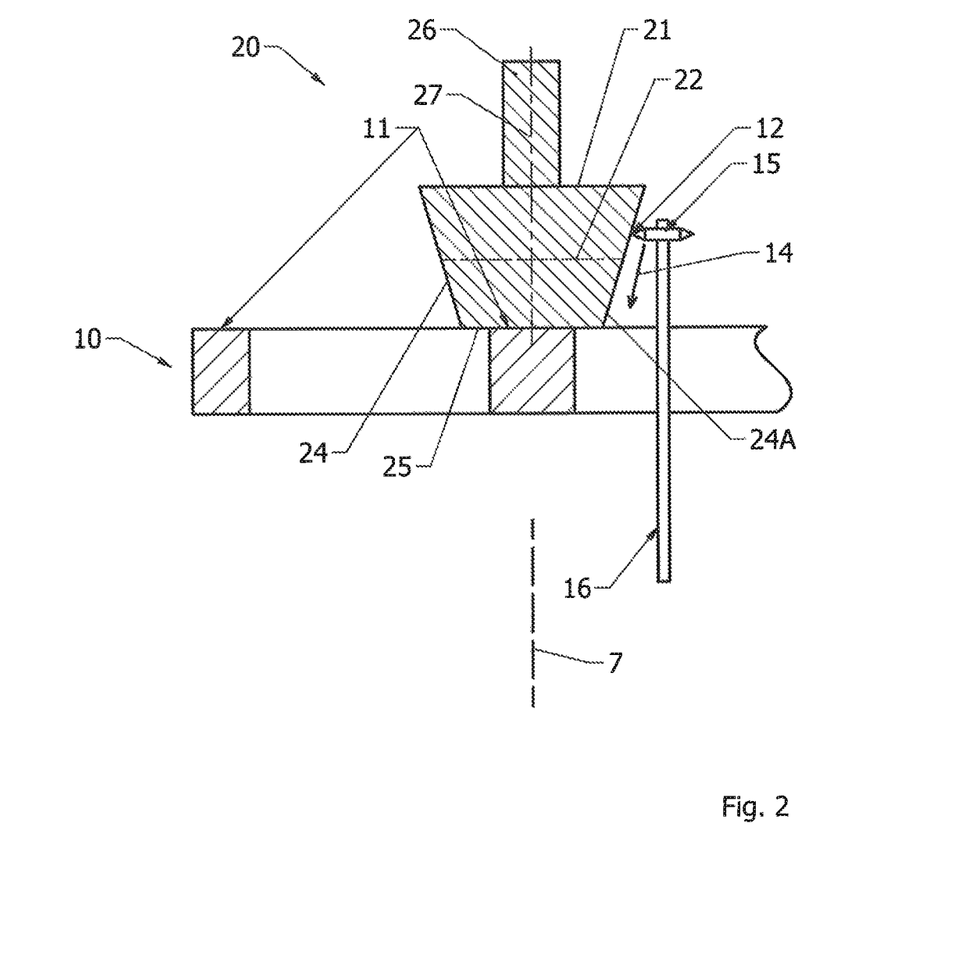
FIG. 2 shows the gauge of FIG. 1 in the same view again, however wherein this time the gauge is placed in a tracing apparatus for use in connection with the invention, and wherein the abovementioned gauge holding condition is effective, and wherein the apparatus is an affordable, non-complex 2D tracing apparatus.

In the situation of FIG. 2 the gauge 20 is resting with its gauge end surface 25 on the apparatus reference plane 11 of the 2D tracing apparatus 10. FIG. 2 additionally shows the tracing point 12, the tracing probe 15 and the tracing arm 16. These parts 12, 15, 16 are part of the tracing structure of the apparatus 10. In the shown situation the tracing point 12 is tracing against and along the gauge contour 24A of the gauge 20 in the tracing direction 14.

For the gauge 20 of FIGS. 1, 2 the gauge reference plane 21 unfortunately is defined by the gauge manufacturer in an unfavourable manner for use with the measuring apparatus 10. The reason is that it is impossible to place the gauge 20 with its gauge reference plane 21 on the apparatus reference plane 11. For use with the measuring apparatus 10, it would have been better if the gauge manufacturer had defined the gauge reference plane 21 to coincide with the gauge end surface 25. But, unfortunately, this is not the case.

The problem now is that it is impossible for the 2D tracing apparatus 10 to reliably measure the axial location of the gauge reference plane 21 relative to the apparatus reference plane 11, since the gauge reference plane 21, as seen in the axial direction 7, is located at an abrupt transition from the conical part of the gauge 20 to the mandrel 26 of the gauge 20. In practice, this abrupt transition means that the circumferential edge of the gauge reference plane 21 is at a location of the gauge 20 where rounding, chamfering, or the like, are present. Such a difficult circumferential edge of the gauge reference plane 21 makes it impossible for the tracing point 12 of the 2D tracing apparatus to reliably determine the axial location of the gauge reference plane 21. So, although the apparatus 10 during tracing in the tracing direction 14 does know the axial position of the tracing point 12 relative to the apparatus reference plane 11, the apparatus 10 does not know the axial position of the tracing point 12 relative to the gauge reference plane 21. Hence, since the gauge plane 22 has its pre-defined axial distance 23 relative to this gauge reference plane 22, the apparatus 10 does not know when the tracing point 12 is at the axial position of the gauge plane during tracing.

Figure 3:
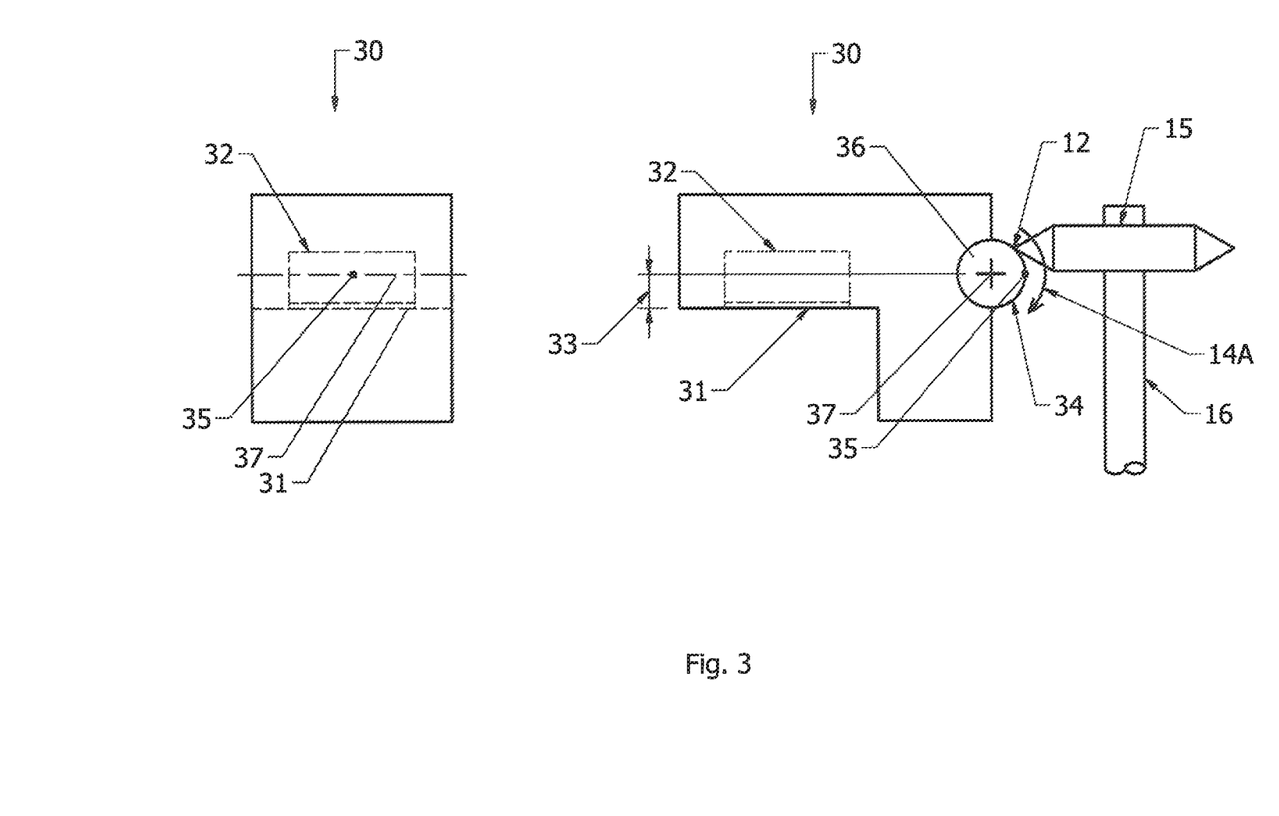
FIG. 3 shows an example of a standard for use in connection with the invention, wherein the left-hand side of FIG. 3 shows a first side view onto the standard, and wherein the right-hand side of FIG. 3 shows a second side view onto the standard, the first and second side views being taken in mutually orthogonal viewing directions, and wherein the viewing direction of the second side view is in a direction parallel to the standard detection line of the standard, and wherein the second side view of FIG. 3 additionally shows part of a tracing structure of the apparatus of FIG. 2.

The abovementioned problem can be effectively solved with the help of the standard 30 of FIG. 3. The standard 30 has the abovementioned standard reference plane 31, standard-to-gauge assembling means in the form of the magnet 32, standard tracing plane 34, standard detection line 35, and calibrated standard distance 33 between the standard reference plane 31 and the standard detection line 35. In the shown example the standard 30 more specifically comprises the cylindrical pin 36 having the pin centre line 37 being parallel to the standard reference plane 31. This cylindrical pin 36 is fixedly attached to or integrally manufactured with the standard 30, in such manner that the external surface portion 34 of the cylindrical pin 36 is forming the abovementioned convex external surface portion (i.e. the standard tracing plane 34) of the standard 30, as well as in such manner that the calibrated standard distance 33 between the standard reference plane 31 and the standard detection line 35 is equal to the distance between the standard reference plane 31 and the pin centre line 37.

FIG. 3 further illustrates how (as seen in the standard-to-gauge condition shown in FIG. 4) the tracing point 12 may be tracing against and along the standard tracing plane 34 in the indicated tracing direction 14A. During this tracing the apparatus is able to establish the axial position of the crown-of-arch of the curved tracing path, i.e. the apex of the curved tracing path. In other words, the apparatus is able to establish the axial position of the standard detection line 35 relative to the apparatus reference plane 11.

Figure 4:
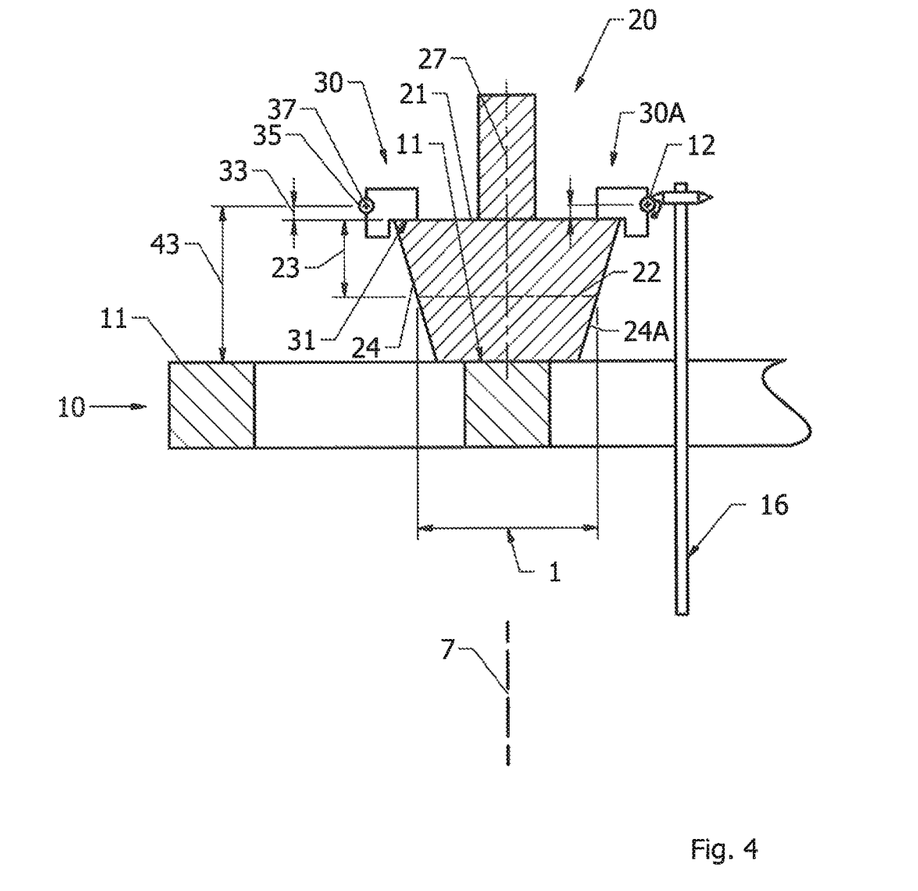
FIG. 4 shows the situation of FIG. 2 in the same view again, however this time together with two standards, which are similar to the standard of FIG. 3, and wherein for each of the two standards the abovementioned standard-to-gauge condition is effective.

The standard 30 of FIG. 4 is similar to the standard 30 of FIG. 3. In FIG. 4 the standard 30 is placed with its standard reference plane 31 onto the gauge reference plane 21 of the gauge 20. It is noted that the standard reference plane 31 has been accurately grinded flat. Also the gauge reference plane 21 of the gauge 20 has been accurately grinded flat, apart from the circumferential edge of the gauge reference plane 21 where rounding, chamfering, or the like, are present.

From FIG. 4 it will be readily appreciated that, by tracing the standard tracing plane 34 of the standard 30 with the tracing point 12 of the apparatus 10, it is possible to determine the axial distance 43, as seen along the axial direction 7, between the pin centre line 37 and the apparatus reference plane 11. Hence, thanks to this use of the standard 30, which has the calibrated standard distance 33 between the pin centre line 37 and the standard reference plane 31, the invention allows to reliably determine the axial distance between the gauge reference plane 21 and the apparatus reference plane 11. This means that, since the gauge plane 22 has its pre-defined axial distance 23 relative to the gauge reference plane 21, the apparatus 10 now reliably knows when the tracing point 12 is at the axial position of the gauge plane 22 during tracing along the gauge contour 24.

It is noted that a similar procedure may be followed for finding out when a tracing point of the stracing structure of the apparatus is at the axial position of the gauge plane 22 during tracing along the opposite gauge contour 24A on the opposite side of the gauge 20. On this opposite side of the gauge 20 this may in principle be done by using the same standard 30. However, in practice it may be preferable to do this by the similar use of a separate standard 30A, similar to the standard 30, having its own corresponding calibrated standard distance between its pin centre line and its standard reference plane. It is noted that on the side of the gauge contour 24A, usually another tracing point of the tracing structure of the apparatus will be used than on the side of the opposite gauge contour 24.

Next, reference is made to FIGS. 5-9, which serve to illustrate some of the many various ways in which standards according to the present invention may be applied. In these FIGS. 5-9 some parts and aspects of the invention that are similar to corresponding parts and aspects of FIGS. 1-4, have been indicated by the same reference numerals as used in FIGS. 1-4.

Figure 5:
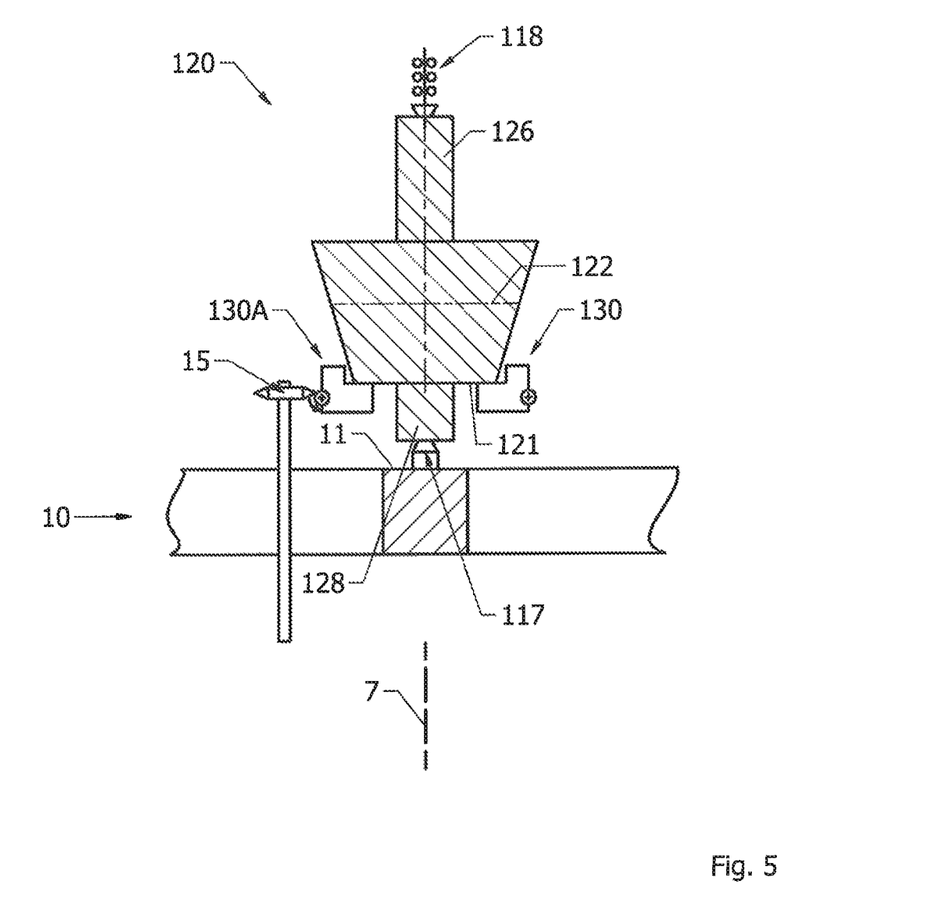
FIG. 5 shows a situation, similar to the situation and view of FIG. 4, and with a similar apparatus and with two similar standards as in FIG. 4, however this time with an example of another conical plug gauge than the gauge of FIG. 4, wherein the gauge of FIG. 5 has two protrusions in the form of two mandrels at the two opposite axial ends of the gauge, respectively, and wherein the gauge of FIG. 5 has a gauge reference plane at a substantially different location as compared to the gauge reference plane of the gauge of FIG. 4.
Figure 6:
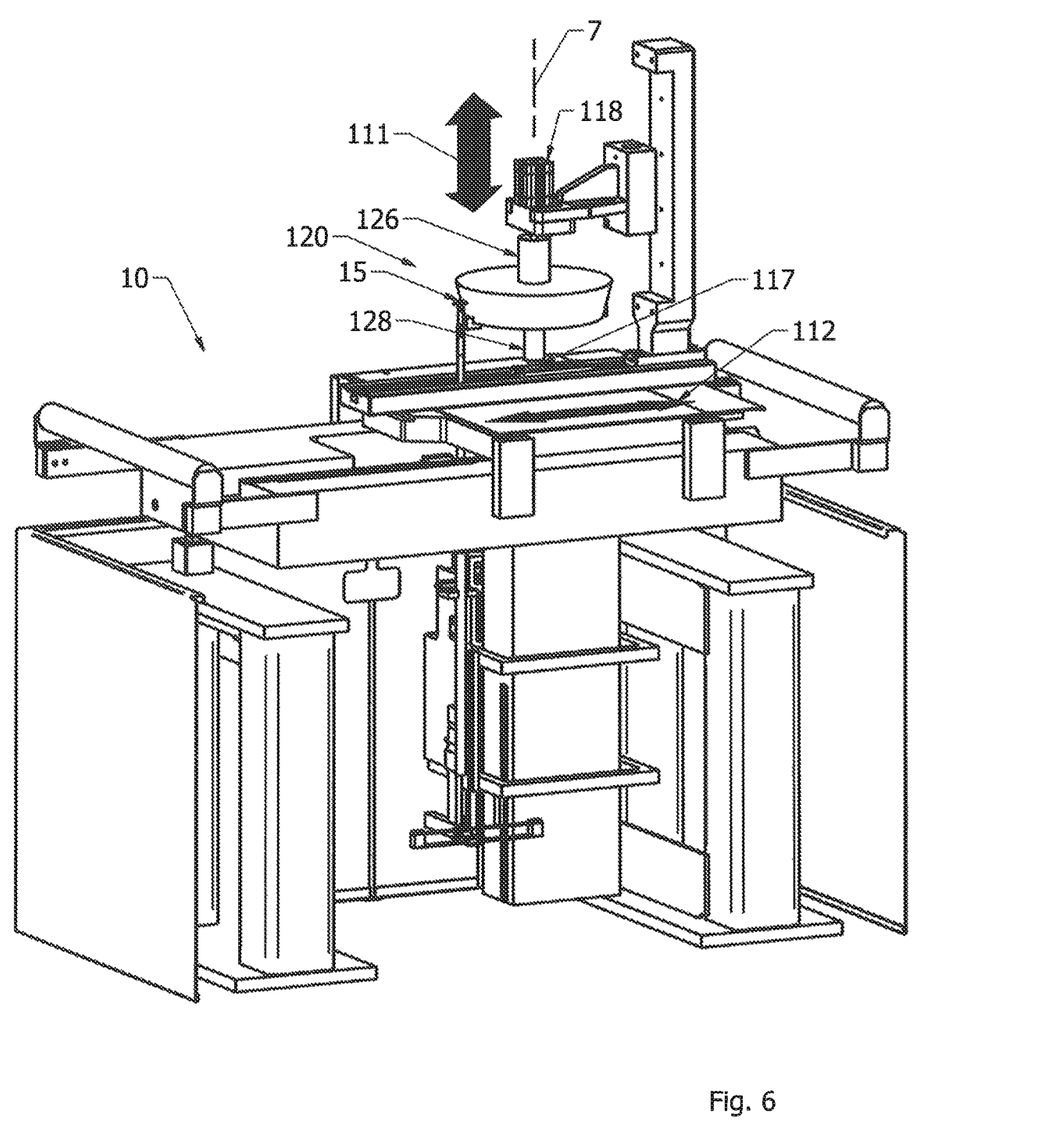
FIG. 6 shows the situation of FIG. 5 in a perspective view, wherein the apparatus, which is a 2D tracing apparatus, is shown to a much greater extent.

FIGS. 5, 6 show the conical plug gauge 120, having two mandrels 126 and 128 at the two opposite axial ends of the gauge 120. The gauge 120 is held between the upper and lower centering elements 117 and 118, respectively of the 2D tracing apparatus 10. In the shown example, the gauge 120 has a gauge reference plane 121 at the transition from the conical part of the gauge 120 to the lower mandrel 128. In FIG. 5 the reference numeral 122 indicates the gauge plane of the gauge 120, wherein the gauge plane 122 is at a pre-defined axial distance relative to the gauge reference plane 121. It is seen that in the situation of FIGS. 5, 6 standards 130 and 130A may be applied similarly to the standards 30 and 30A of the example of FIG. 4.

FIG. 6 serves to provide a more complete general impression of the 2D tracing apparatus 10. In FIG. 6, the reference numerals 111 and 112 are indicating the vertical and horizontal tracing directions, respectively, of the tracing point of the tracing structure of the apparatus 10.

Figure 7:
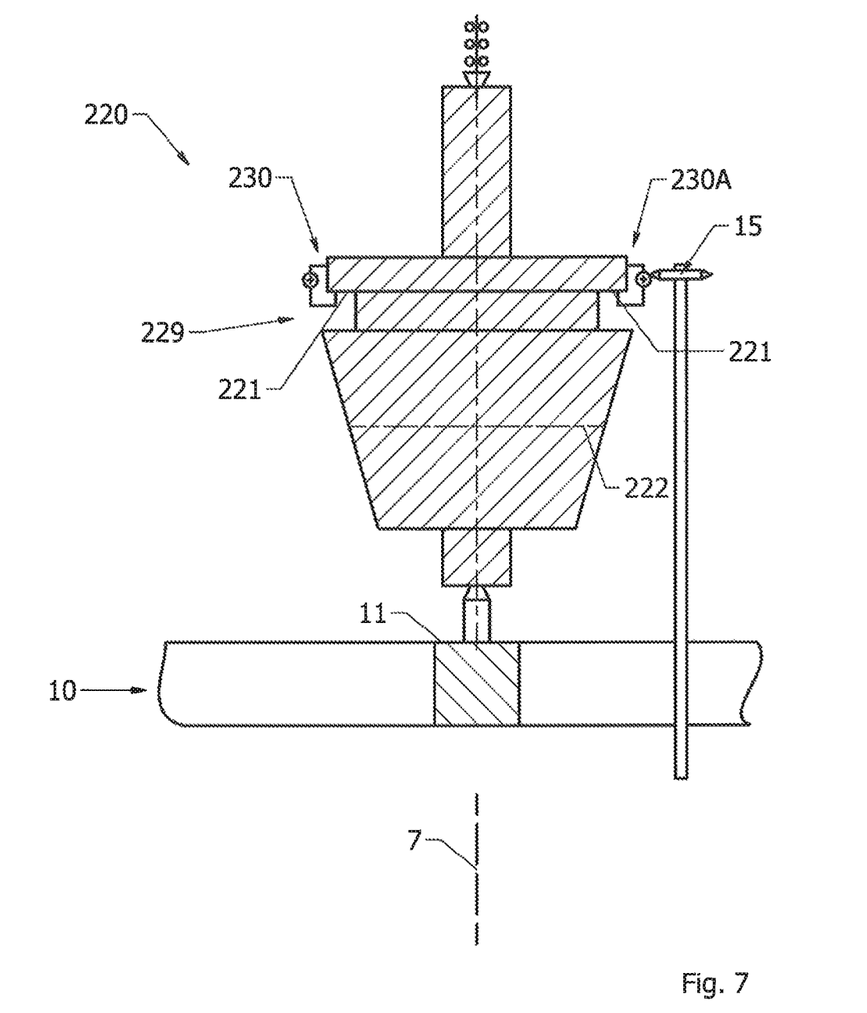
FIG. 7 shows a situation, similar to the situation and view of FIG. 5, and with a similar apparatus and with two similar standards as in FIG. 5, however this time with an example of another conical plug gauge than the gauge of FIG. 5, wherein the gauge of FIG. 7 has a circumferential groove, and wherein the gauge of FIG. 7 has a gauge reference plane at a substantially different location as compared to the gauge reference plane of the gauge of FIG. 5.

FIG. 7 shows the conical plug gauge 220, having the circumferential groove 229, and wherein the gauge 220 has a gauge reference plane 221 at an upper boundary wall of the groove 229. In FIG. 7 the reference numeral 222 indicates the gauge plane of the gauge 220, wherein the gauge plane 222 is at a pre-defined axial distance relative to the gauge reference plane 221. It is seen that in the situation of FIG. 7 standards 230 and 230A may be applied similarly to the standards 30 and 30A of the example of FIG. 4.

Figure 8:
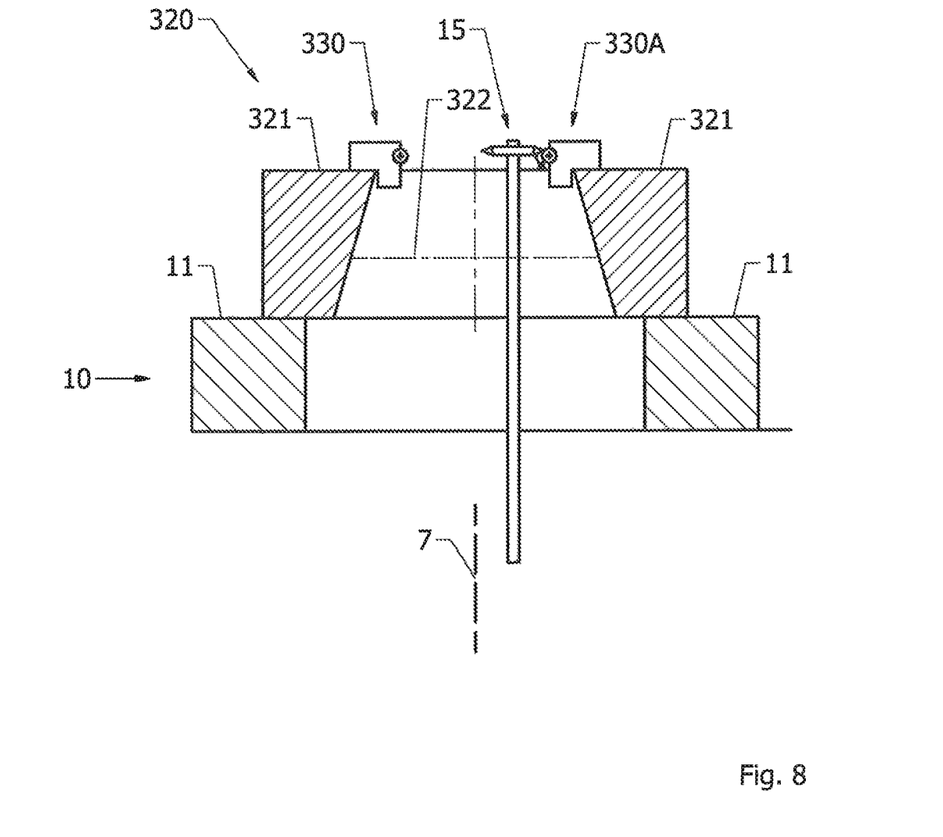
FIG. 8 shows a situation, similar to the situation and view of FIG. 4, and with a similar apparatus and with two similar standards as in FIG. 4, however this time with an example of another gauge than the conical plug gauge of FIG. 4, wherein the gauge of FIG. 8 is a conical ring gauge.

FIG. 8 shows the conical ring gauge 320, wherein the gauge 320 has a gauge reference plane 321 at the shown upper side of the gauge 320. In FIG. 8 the reference numeral 322 indicates the gauge plane of the gauge 320, wherein the gauge plane 322 is at a pre-defined axial distance relative to the gauge reference plane 321. The geometrical characteristic of gauge 320 that has to be measured is the inside diameter of the gauge 320 at the gauge plane 322. It is seen that in the situation of FIG. 8 standards 330 and 330A may be applied similarly to the standards 30 and 30A of the example of FIG. 4. It is noted that the gauge 320 could in principle be mounted in the apparatus 10 in an upside down manner as compared to the situation of FIG. 8. In that case the gauge reference plane 321 and the apparatus reference plane 11 in the abovementioned gauge holding condition would be contactingly lying against one another in a mutually parallel manner. However, if the gauge 320 would be thus mounted upside down, the tracing point of the probe 15 would not be able to reach the locations in the gauge plane 322 where the inside diameter of the gauge 320 has to be measured.

Figure 9:
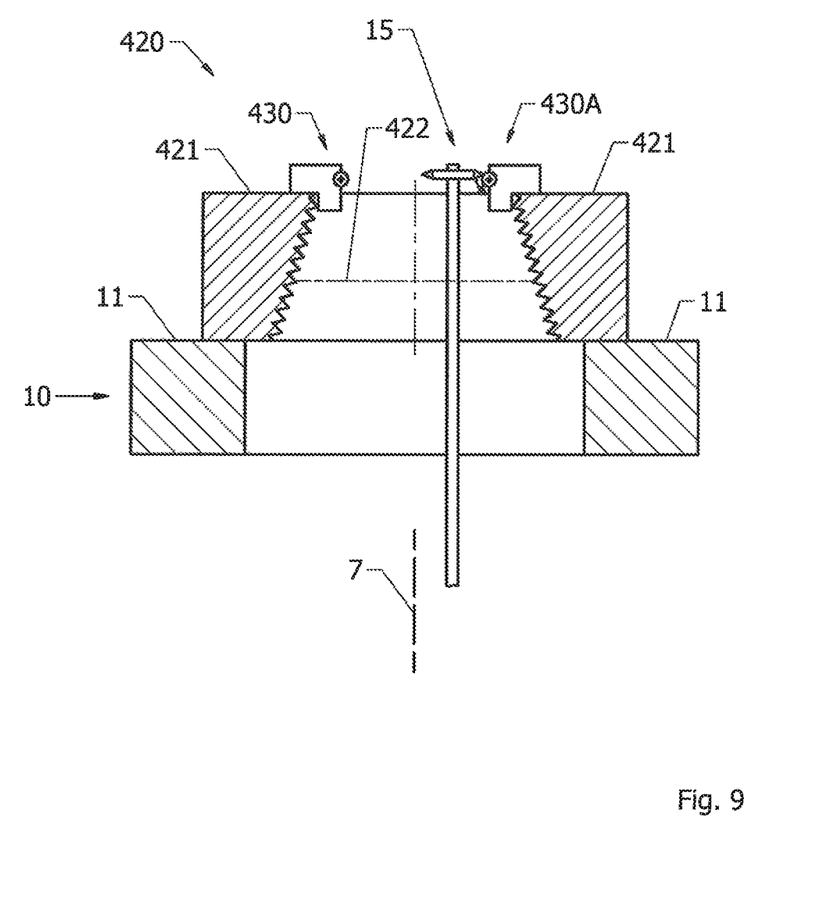
FIG. 9 shows a situation, similar to the situation and view of FIG. 8, and with a similar apparatus and with two similar standards as in FIG. 8, however this time with an example of another conical ring gauge than the conical ring gauge of FIG. 8, wherein the gauge of FIG. 9 is a screw thread gauge.

FIG. 9 shows the conical ring gauge 420, wherein the gauge 420 has a gauge reference plane 421 at the shown upper side of the gauge 420. It is seen that the gauge 420 is a screw thread gauge. In FIG. 9 the reference numeral 422 indicates the gauge plane of the gauge 420, wherein the gauge plane 422 is at a pre-defined axial distance relative to the gauge reference plane 421. It is seen that in the situation of FIG. 9 standards 430 and 430A may be applied similarly to the standards 330 and 330A of the example of FIG. 8.

While the invention has been described and illustrated in detail in the foregoing description and in the drawing figures, such description and illustration are to be considered exemplary and/or illustrative and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. A method for measuring at least one geometrical characteristic of a gauge in a gauge holding condition, in which the gauge is held in an apparatus for measuring at least part of a gauge contour of the gauge by tracing the gauge contour with a tracing point of a tracing structure of the apparatus against and along said gauge contour, said tracing the gauge contour taking place in a tracing direction, which has at least a component in an axial direction being parallel to a gauge centre line of the gauge, wherein:
    the gauge has a gauge reference plane, being a two-dimensionally straight external surface portion of the gauge, and being perpendicular to said axial direction, said at least one geometrical characteristic of the gauge is occurring in a gauge plane, which is perpendicular to the gauge centre line, said gauge plane having a pre-defined axial distance relative to said gauge reference plane, as seen along the gauge centre line;
and wherein, as seen in said gauge holding condition:
    the apparatus has an apparatus reference plane, being a two-dimensionally straight external surface portion of the apparatus, and being perpendicular to said axial direction;
    the apparatus is configured for determining, as a function of time during said tracing the gauge contour, the relative axial position along said axial direction of said tracing point relative to said apparatus reference plane, as well as the radial position of said tracing point relative to said gauge centre line;
wherein the method comprises the steps of:
    providing at least one standard, which comprises:
        standard-to-gauge assembling means for releasably assembling the standard to the gauge in a mutually assembled standard-to-gauge condition of the standard and the gauge;
        a standard reference plane, being a two-dimensionally straight external surface portion of the standard, wherein the standard reference plane and the gauge reference plane in said standard-to-gauge condition are contactingly lying against one another in a mutually parallel manner;
        a standard tracing plane, being a convex or concave external surface portion of the standard, and forming a tracing surface for the tracing point of the tracing structure of the apparatus as seen in a combined assembling condition of both said gauge holding condition and said standard-to-gauge condition, wherein the standard tracing plane has a standard detection line, being a line segment formed by crown-of-arch positions on the standard tracing plane of said convexness or concaveness as will be experienced during tracing the standard tracing plane with the tracing point in said combined assembling condition, and wherein the standard detection line is parallel to the standard reference plane; and
        a calibrated standard distance between said standard detection line and said standard reference plane, as seen in a direction perpendicularly to said standard reference plane;
    bringing the apparatus, the gauge and the standard in said combined assembling condition;
    in said combined assembling condition: tracing the standard tracing plane of the standard with the tracing point of the tracing structure of the apparatus, thereby determining, as a function of time during said tracing the standard tracing plane, the relative axial position along said axial direction of said tracing point relative to said apparatus reference plane, as well as the radial position of said tracing point relative to said gauge centre line, thereby determining the axial distance, as seen along said axial direction, between said standard detection line and said apparatus reference plane.

2. A method according to claim 1, wherein the apparatus is a two-dimensional tracing apparatus in that the apparatus is configured such that, during said tracing the gauge contour with the tracing point, the tracing point remains in a two-dimensional plane, which contains said gauge centre line, wherein the movement of the tracing point is being actuated by the apparatus in said axial direction being parallel to the gauge centre line, while at the same time the tracing point is following the gauge contour in radial direction relative to the gauge centre line.

3. A method according to claim 1, wherein the standard-to-gauge assembling means of the standard comprises a for said releasably assembling the standard to the gauge.

4. A method according to claim 1, wherein the standard comprises a cylindrical pin having a pin centre line being parallel to the standard reference plane, wherein the cylindrical pin is fixedly attached to or integrally manufactured with the standard in such manner that:
- an external surface portion of the cylindrical pin is forming said convex external surface portion of the standard; and
- said calibrated standard distance between said standard reference plane and said standard detection line is equal to the distance between said standard reference plane and the pin centre line, as seen in a direction perpendicularly to said standard reference plane.

5. A system configured for carrying out a method according to claim 1, wherein the system comprises:
- an apparatus for measuring at least part of a gauge contour of the gauge by tracing the gauge contour with a tracing point of a tracing structure of the apparatus against and along said gauge contour, said tracing the gauge contour taking place in a tracing direction, which has at least a component in an axial direction being parallel to a gauge centre line of the gauge, wherein:
  - the gauge has a gauge reference plane, being a two-dimensionally straight external surface portion of the gauge, and being perpendicular to said axial direction,
  - said at least one geometrical characteristic of the gauge is occurring in a gauge plane, which is perpendicular to the gauge centre line, said gauge plane having a pre-defined axial distance relative to said gauge reference plane, as seen along the gauge centre line;
  - and wherein, as seen in said gauge holding condition:
    - the apparatus has an apparatus reference plane, being a two-dimensionally straight external surface portion of the apparatus, and being perpendicular to said axial direction;
    - the apparatus is configured for determining, as a function of time during said tracing the gauge contour, the relative axial position along said axial direction of said tracing point relative to said apparatus reference plane, as well as the radial position of said tracing point relative to said gauge centre line; and
- at least one standard which comprises:
  - standard-to-gauge assembling means for releasably assembling the standard to the gauge in a mutually assembled standard-to-gauge condition of the standard and the gauge;
  - a standard reference plane, being a two-dimensionally straight external surface portion of the standard, wherein the standard reference plane and the gauge reference plane in said standard-to-gauge condition are contactingly lying against one another in a mutually parallel manner;
  - a standard tracing plane, being a convex or concave external surface portion of the standard, and forming a tracing surface for the tracing point of the tracing structure of the apparatus as seen in a combined assembling condition of both said gauge holding condition and said standard-to-gauge condition, wherein the standard tracing plane has a standard detection line, being a line segment formed by crown-of-arch positions on the standard tracing plane of said convexness or concaveness as will be experienced during tracing the standard tracing plane with the tracing point in said combined assembling condition, and wherein the standard detection line is parallel to the standard reference plane; and
  - a calibrated standard distance between said standard detection line and said standard reference plane, as seen in a direction perpendicularly to said standard reference plane.

* * * * *